April 6, 1965 N. E. PEDERSEN 3,177,060
METHOD OF FORMING DEEP-SIDED VESSELS FROM THERMOPLASTIC SHEETS
Filed May 28, 1959 2 Sheets-Sheet 1

Fig.I.

INVENTOR.
Norman E. Pedersen
BY
Christy, Parmelee Stickland
ATTORNEYS

United States Patent Office 3,177,060
Patented Apr. 6, 1965

3,177,060
METHOD OF FORMING DEEP-SIDED VESSELS FROM THERMOPLASTIC SHEETS
Norman E. Pedersen, Troy, N.Y.
(16 Federal St., Wilmington, Mass.)
Filed May 28, 1959, Ser. No. 816,498
9 Claims. (Cl. 65—106)

This invention relates to the shaping of thermoplastic material, and is for a method by which glass and other heat-softenable sheet material may be shaped into vessel-like shapes having a bottom and sides, and especially shapes having deep sides or intricate shapes.

My invention is especially applicable to forming flat sheet glass into deep vessel-like shapes, and especially shapes that cannot be economically made at the present time, and it will be hereinafter particularly described in connection with the shaping of sheet glass, but is not to be construed as being limited to such purposes.

It is, of course, well known to shape molten glass by dropping a gob of molten glass into a mold and then subjecting it to pressure by means of a plunger die that enters the mold and forms the glass by forcing it into the space between the plunger and the walls of the mold cavity, but this is feasible for only relatively small articles. It is also known to make simple glass shapes by a sagging procedure in which a glass sheet is laid over a simple mold cavity and then the glass is gradually heated to a point where it sags of its own weight until it conforms to the shape of the mold cavity, but this process is applicable only to the making of simple shapes and relatively shallow shapes.

Glass, as well as optically transparent plastics, have a substantial opacity to infra-red radiation, so that it may be heated by radiation from an infra-red heat source. The present invention has for its object to provide a method for the forming of such flat sheet material by subjecting its opposite surfaces to differential air pressure while maintaining it at a proper deformation temperature by infra-red radiation.

A further object of my invention is to provide a method of forming sheet material into a vessel-like shape while keeping the margins of the sheet sealed against the top surface of the mold.

A further object of my invention is to provide a method of forming sheet glass into hollow shapes while reducing breakage of glass to a commercially useful level.

These and other objects and advantages are secured by my invention as will be more fully apparent from the accompanying detailed description in conjunction with the accompanying drawings, in which.

Figure 1:
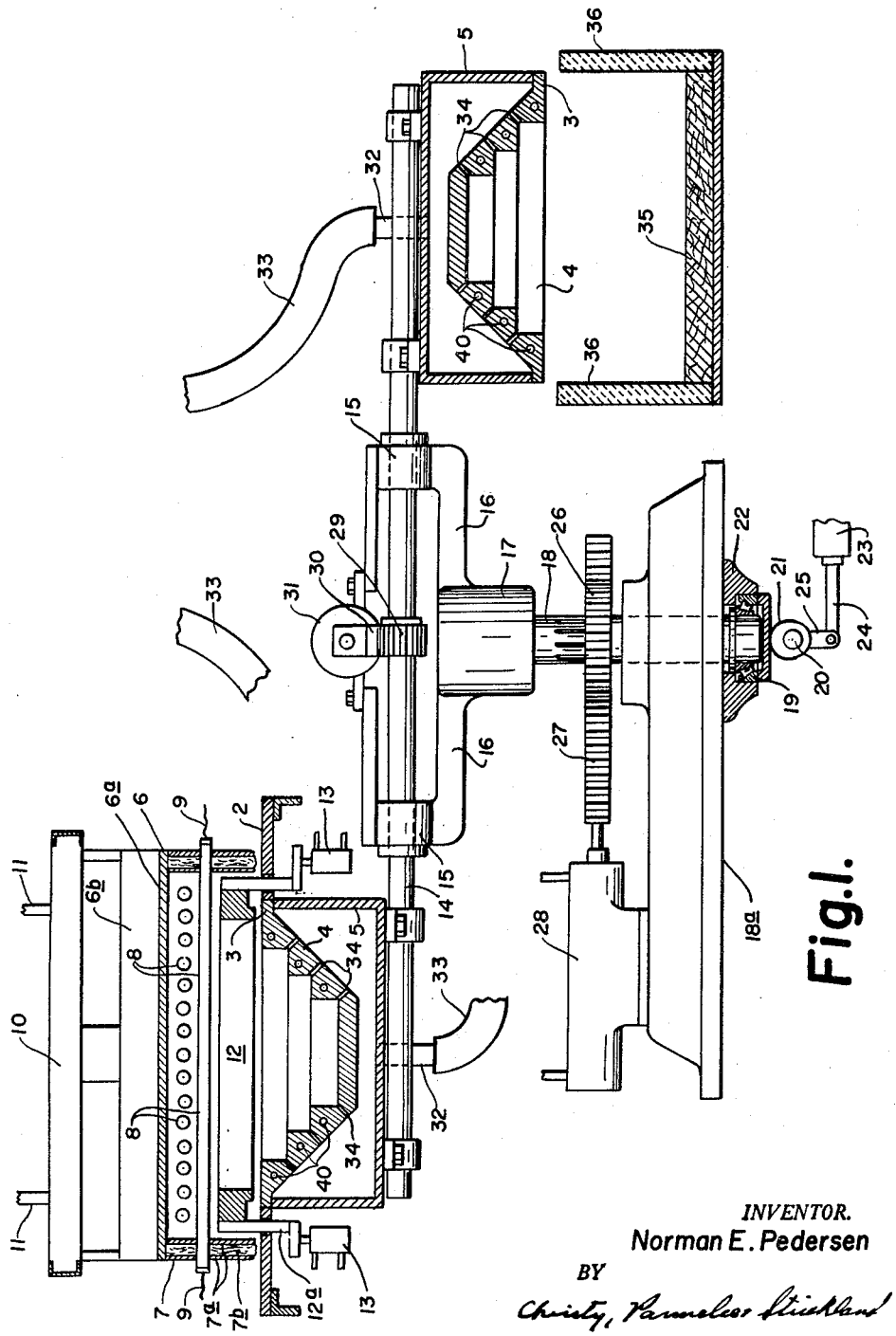
FIG. 1 is a more or less schematic view of one form of apparatus for practising my invention, the view being a generally vertical section, partly in elevation, showing the initial step in the process.
Figure 2:
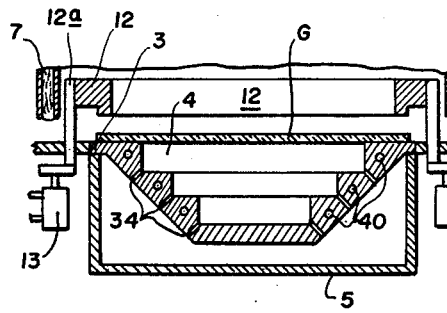
FIG. 2 is a fragmentary view of the left-hand end of the apparatus shown in FIG. 1, with the flat sheet of material to be shaped in position to be heated, this view also being a vertical section.
Figure 3:
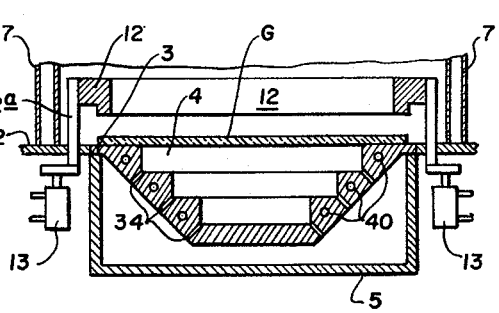
FIG. 3 is a view similar to FIG. 2 showing the next step in the method.
Figure 4:
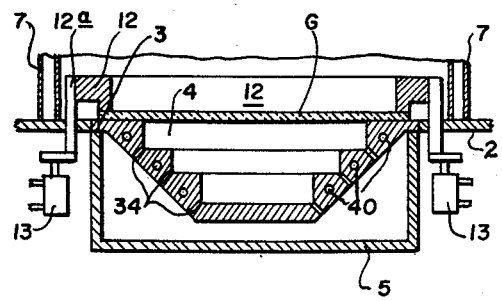
FIG. 4 is a view similar to FIG. 3, but showing the next step where the margin clamping frame has been lowered.
Figure 5:
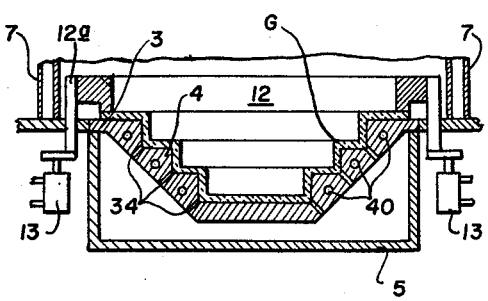
FIG. 5 is a view similar to FIG. 4 showing the formed product in the mold ready to be removed from the mold.

For a more complete understanding of the invention, the apparatus shown in FIG. 1 will be first described in detail. In this figure, and referring first to the left side of the figure, 2 designates a flat-top table which is supported at a fixed level by a supporting frame, which, for clearness of illustration, has not been shown in the drawings. It may be in the form of stainless steel plate with a central opening of an area to receive the top flange 3 of the metal mold 4, which is here illustrated as having a deep four-sided cavity having a series of steps in the sides, representing a difficult shape to form from glass. It may typically be a glass cover for a lighting fixture. The mold is enclosed in and supported by a box-like metal casing 5. The top flange 3 of the mold extends around the entire cavity and is normally flush with the top of the table 2, and the edges of the mold are close to the surrounding table to minimize the inflow of air.

Above the table 2 there is a hood 6 over the table 2 of an area larger than the area of the mold. It has a water-cooled top reflector plate 6a, 6b designating a water-cooling chamber. It has depending heat insulating sides 7 which are here shown to be comprised of two rigid sheets 7a of a heat-resistant bonded mica composition with a felted pad of mineral wool 7b therebetween. The felt protrudes slightly below the plates 7a to make close contact with the top of the table 2 when the parts are in the position shown in FIG. 1, to thereby exclude the flow of air between the table top and the edges of the side walls of the hood.

The hood has electric infra-red heaters therein, these being here represented as rod-like elements 8 arranged in two tiers, one above the other, with the elements of one tier being at right angles to those of the other, the elements of each tier being parallel and closely spaced so that heat can be radiated in effect from the entire top of the hood. The ends of the heaters provide terminals for electric supply wires 9 and extend through the sides of the hood. Actually the heating elements are preferably incandescent filaments of special construction supported inside quartz tubes, which in turn are surrounded by other quartz tubes through which air is circulated. The actual construction of the hood and heaters is more fully disclosed and claimed in copending application Serial No. 816,460, filed May 28, 1959, now Patent No. 3,059,086. Such heaters can be operated at a high temperature for a sustained period of time, the quartz being highly transparent to infra-red heat, the circulation of air through the outer of the two enclosing tubes keeping the quartz of the inner tube below its sagging or devitrification temperature, but with little obstruction to the infra-red radiation. This enables the heaters to operate at ambient temperatures at and above 1800° F. In fact water cooling of the top of the hood is used to prevent the melting of the reflector plate 6a. The entire hood is suspended from a supporting frame 10 so that it may be raised and lowered through a limited range of movement, rods 11 being shown that may be operated by hydraulic cylinders or any other mechanical means not important to the method.

Inside the hood there is a clamping frame 12 that overhangs the flange 3 of the mold. I have here shown rods 12a attached to the frame and passing through the table for raising and lowering the frame, hydraulic cylinders 13 being indicated for effecting this raising and lowering of the frame.

The mold and its enclosing casing are secured to one end of a supporting shaft 14 that passes through bearings 15 on supporting arms 16, the shaft having a similar mold at its opposite end inverted with respect to the first, but otherwise they are the same and designated by similar reference numerals.

The supporting arms 16 are carried on a hub 17 at the top of a shaft or post 18 carried on a supporting base 18a. The lower end of the shaft is supported on a thrust bearing 19 that can be raised and lowered to move the shaft up and down. For this purpose I have indicated a rock shaft 20 with a cam 21 bearing against the thrust bearing, which bearing is in a keeper 22. The rock shaft may be turned through a limited arc by a fluid pressure cylinder 23 having a piston rod 24 connected to a crank arm 25 on the rock shaft 20.

There is shown a gear 26 splined on the shaft 18. A rack 27 operated by a cylinder and piston 28 engages this gear for rotating the shaft 18 back and forth through an arc of 180°. Also the shaft 14 has a pinion 29 thereon. There is a rack 30 operated by a fluid pressure cylinder 31 supported on the arms 16 for rotating shaft 14 through an arc of 180°. By rotating post 18 through an arc of 180° the positions of the two molds may be reversed; by rotating shaft 14 through an arc of 180°, first one mold and then the other can be inverted. By turning the cam 21 the molds can be raised to the level of the table 2 or dropped to clear the table to permit the mold to swing in a horizontal arc.

Each mold enclosure 5 has a connection 32 to which is fixed a flexible hose 33 leading to a vacuum pump (not shown) for exhausting air from the casing. The mold has several small openings 34 at different levels therein, preferably at the four corners of each step through which air may be drawn into the casing for exhausting the air from the molds.

Under the inverted mold at the right-hand side of FIG. 1 there is an asbestos pad 35 onto which the molded piece may drop from the mold, and from which it may be immediately pushed by a pusher (not shown) into a lehr, while heat insulating walls 36 exclude drafts of ambient air.

The method may now be described. For the processing of sheet glass, such as double-thickness window glass, the heaters are energized with the hood closed against the table 2, as shown in FIG. 1. The heating is continued until the ambient temperature under the hood (as indicated by a pyrometer not shown) is about 1400° F., at which time the surface of the mold exposed to the heat will be at that temperature. At this time the clamping frame 12 is raised above the mold flange 3, and it, too, will be heated to the ambient temperature under the hood. Since the air under the hood is not directly heated by radiation, but only by contact with the mold, the heater elements and walls of the hood, the ambient temperature under the hood is a reliable indication of the mold surface temperature. When this temperature has been reached, the hood is raised and a sheet of glass G of the proper size is slid over the table 2 onto the mold so that it is centered over the mold with its margins supported on the mold flange.

Immediately upon positioning the glass sheet in this manner, the hood is again lowered until the ambient temperature reaches at least 1300° F. The glass will absorb from 10 to 15% of the radiant heat, and radiant heat which is not absorbed will be absorbed by the mold to keep it hot or reflected back through the glass to be further absorbed. The glass will be heated uniformly through its thickness in this way rather than being heated by conduction of heat from one or both surfaces to the center, as would be the case if gas flames, for example, were used to generate heat under the hood. The margins of the glass, in the shadow of the frame 12, will be heated by contact with the mold flanges 3 and radiation from the heated frame 12, and by radiation from the incandescent flange of the mold. It is important that the mold temperature be over 1000° F. when the glass is put into position, as the glass must be quickly heated to about its softening temperature, as otherwise it will break, particularly if the mold flanges on which it rests are not sufficiently hot.

When the ambient temperature reaches 1300° F., or as it approaches close to this temperature, the frame 12 is drawn down to hold the glass tight against the flange 3 of the mold. The frame has a small ridge on the under surface to reduce the area of contact with the glass so that with moderate pressure on the frame, the pressure per square inch applied to the glass is relatively great and the area of the glass completely confined between the flange and the frame is small. If the glass has not become sufficiently hot before the frame 12 is lowered, the seal between the glass and the mold may not be good, or the glass will break. At 1400° F., or preferably 1430° F., the glass may be deformed but will not become sticky or tacky or melt down. There is only a limited temperature range between which the glass is soft but not sticky, or even viscously fluid. The radiant electric heating elements are subject to very accurate control so that noticeable variation of temperature of the glass over the area of the sheet can be avoided and the temperature be desirably uniform. Also, with these heaters, the optimum temperature can be reached quickly and held accurately in the critical range.

It is important that after the glass has been positioned over the mold and the hood brought down, any flow of air from around the outside of the hood be excluded, and it is for this reason that the edges of the hood contact the table 2 and exclude drafts under the hood. Draft will cause cracking or unequal heating.

After the clamping frame has been lowered to clamp the margins of the glass sheet against the mold flange and the temperature is steady at 1430° F., air is exhausted from the mold, preferably with considerable rapidity by connecting the hose 33 to a vacuum pump. The heat of course continues to be supplied during this entire time from the radiant elements 8, and the heat-softened glass is drawn down into the mold. A vacuum of about 20 inches of mercury or more is desired, and the suction is continued until the indicating dial at the central panel (not shown) holds steady, and usually for a short time thereafter to assure the glass completely filling out the mold. The minimum time must be determined by trial, as it will vary with the shape of the mold. As the glass is drawn down into the mold, it is stretched, and this occurs uniformly because of the uniform heating of the glass, other than at the margins of the sheet where they extend over the flange 3. These margins are stretched very little. For lighting fixtures this is desirable, and for other purposes it is not detrimental.

When the shaping of the piece has been completed, the piece must cool for a period of time—around 30 seconds—before it will shrink away from the mold sufficiently to be removed. With my method, I drop the mold below the level of the table 2 sufficiently to clear the table, swing it around to the right-hand position, and invert the mold, allowing the piece to drop from the mold when it becomes sufficiently cool. When the piece drops out of the mold it has internal stresses, especially in a piece of the intricate shape here shown, and is likely to break if exposed to draft. Consequently it is desirable to push or transfer it into a lehr for annealing immediately upon its removal from the mold, and the heat-insulating walls 36 exclude, to a large extent, drafts of ambient cold air. It is contemplated that pad 35 would be close to the entrance to the lehr.

While one mold is releasing its piece, the other one will have moved under the hood and will be in the position shown in the left side of FIG. 1, the hood lowered and the heating of the mold preparatory to receiving the glass sheet to be next formed will take place.

Temperatures herein given have been found to be suitable for one widely available brand of window glass, but it is to be understood that for glass of a different composition, other temperatures may be critical. However, the procedure will be the same involving heating the mold surface to a temperature close to the softening point of the glass; putting the glass in place over the hot mold; clamping the margins of the sheet against the mold as the sheet approaches the bending temperature; bringing up the temperature of the glass uniformly over the area to be shaped until this area is soft enough to be drawn down into the mold, while avoiding any draft of outside air; drawing the glass down into the mold by differential pressure of air on the two surfaces; removing the mold with the formed glass from under the heaters; and finally letting the glass cool until it is free to be easily removed from the mold. A further important procedure is the alternate use of two molds so that one may be brought to position under the heaters while the piece is being removed from the other one. As previously pointed out, the preheating of the mold to a point where its surface temperature is close to the softening point of the glass before the glass is put into position is important. The clamping of the margins of the sheet against the mold flanges is important, as otherwise in making a piece having side and end walls the sides of the sheet may buckle, breaking the vacuum under the sheet so that it does not draw down into the mold. After the apparatus has been started, the average time cycle is about 3½ to 4½ minutes per piece for forming a glass sheet of double thickness into a reasonably large piece of the shape shown.

In shaping thermoplastic organic plastic sheets, the temperatures are much lower, but otherwise the procedure is essentially the same. It must be heated uniformly and the temperature must be held constant at a point where the sheet can be drawn down into the mold, without being melted or heated to a tacky condition, and the edges of the sheet must be held against the rim of the mold so as to enable an adequate vacuum to be produced in the mold.

Variations in the procedure will enable the time cycle to be reduced. For example, after the molded piece has been removed from the mold, heat can be applied to the mold from some source other than the heaters in the hood so that the rim or flange of the mold will be hot enough to receive the glass at, or even before the mold is brought to position under the hood. For example, resistance heaters, as indicated at 40 in FIG. 1, may be built into the mold walls to keep the interior of the mold at a temperature of about 1000° F., or even gas burners may be provided to heat the mold after the piece has been discharged. Thus while sufficient cooling takes place for the mold piece to be easily removed from the mold, the internal temperature of the mold may be maintained at a minimum temperature of around 1000° F. Also, with such a heated mold, the sheet of glass may be held by edge clamps (not shown) under the hood to be heated by radiation for a short time interval between the time when one mold is withdrawn from under the hood and the other one moved into position, such clamps being arranged to drop the sheet onto the hot mold as soon as the mold reaches its working position.

It will be understood that the apparatus here shown is one form of apparatus that may be employed, but the invention is not limited to use with such apparatus. The invention is an improvement on the method and apparatus disclosed in my copending application Serial No. 718,866, filed March 3, 1958, now abandoned.

I claim:

1. The method of forming sheet glass into non-planar shapes by means of a cavity mold, which comprises heating the mold to a temperature approximating the temperature at which the glass softens, then placing the glass sheet to be processed over the mold with its margins supported by the rim of the mold and quickly bringing the edges up to a temperature approximating the softening point of the glass while also heating the area of the glass over the mold by radiation, clamping the margins of the glass sheet against the rim of the mold, heating the glass while so clamped to its softening temperature but below its melting point while protecting it from external drafts of air, and when the glass has become sufficiently soft, exhausting air from the mold cavity and drawing the sheet down into the mold, thereafter allowing the piece so formed to partly cool in the mold only sufficiently for it to shrink from the mold walls and then thereafter removing it from the mold while the mold is maintained at a temperature of approximately at least 1000° F.

2. The method of forming sheet glass into deep-sided vessel-like shapes which comprises placing a flat sheet of glass over a previously-heated cavity mold with the edges only of the sheet resting on the mold, heating the glass, including the edges, to a temperature approximating the softening temperature, thereafter clamping the heated edges of the sheet in fixed position around the periphery of the mold cavity, raising the temperature of the exposed area of the sheet to a softening temperature but below its melting temperature, and then forcing the glass into the mold by subjecting its opposite faces to differential pressures of air and while the glass is kept at a deforming temperature by infra-red radiation, allowing the glass to partially cool and contract in the mold and then removing it from the mold but while the mold remains heated at a temperautre of around 1,000° F.

3. The method of forming sheet glass into deep-sided shapes as defined in claim 2 in which the glass is enclosed against contact with drafts of outside air while the edges are clamped and the forming is being effected.

4. The method of forming sheet glass into deep-sided hollow shapes with the use of a mold shaped to the contour of the piece to be produced, which comprises heating the inside of the mold to a temperature where the mold surface is glowing with heat, then placing a sheet of glass over the mold with the margins only of the sheet supported on the rim of the mold and confining the mold and glass in a closed environment, raising the ambient temperature in the environment to a point where the margins of the glass may be clamped against the rim of the mold without breaking, but below the temperature at which the glass melts, then clamping the edges of the sheet against the rim of the mold, increasing the ambient temperature in the closed environment by radiant heat until the glass is in a stretchable but not fluid state, then evacuating air from the mold while keeping the glass in a stretchable condition by radiant heat until the glass has been shaped to conform to the mold by the air pressure differential on the two surfaces of the glass, then removing the mold from said environment and when the formed glass becomes loose in the mold, removing it.

5. The method defined in claim 4 in which the mold is inverted after removal from said environment and the glass removed by gravity when it becomes sufficiently cool.

6. The method defined in claim 4 in which a second mold is entered into the closed environment to be heated while the glass in the first mold is cooling to a temperature where it may be removed from the mold.

7. The method of heat-shaping flat sheet glass into a molded non-planar shape which comprises rapidly heating the margins of a glass sheet by resting the margins of the sheet on the incandescent rim of a cavity mold and while rapidly heating the area of the sheet out of contact with the mold uniformly with infra-red radiation whereby breakage of the glass sheet is avoided, then heating the glass and mold interior by continued infra-red radiation in a closed environment until the glass is stretchable, then evacuating air from the mold cavity while holding the margins of the sheet tight against the rim of the mold and continuing the heating until the glass has been shaped substantially to the contour of the mold cavity.

8. The method of heat-shaping flat sheet glass into a molded non-planar shape which comprises rapidly heating the margins of a glass sheet by resting the margins on the incandescent rim of a cavity mold and while rapidly heating the area of the sheet out of contact with the mold uniformly with infra-red radiation whereby breakage of the glass sheet is avoided, then heating the glass and mold interior by continued infra-red radiation in a closed environment until the glass is stretchable, then evacuating air from the mold cavity while holding the margins of the sheet tight against the rim of the mold and continuing the heating until the glass has been drawn and stretched to the contour of the mold.

9. The method of forming sheet glass into deep-sided hollow shapes with the use of a mold shaped to the contour of the piece to be produced, which comprises heating the inside of the mold to a temperature where the mold surface is glowing with heat, then placing a sheet of glass over the mold with the margins only of the sheet supported on the rim of the mold and confining the mold and glass in a closed environment, raising the ambient temperature in the environment to a point where the margins of the glass may be clamped against the rim of the mold without breaking, but below the temperature at which the glass melts, then clamping the edges of the sheet against the rim of the mold, increasing the ambient temperature in the closed environment by radiant heat until the glass is in a stretchable but not fluid state, then evacuating air from the mold while keeping the glass in a stretchable condition by radiant heat until the glass has been shaped to conform to the mold by the air pressure differential on the two surfaces of the glass, then removing the mold from said environment and when the formed glass becomes loose in the mold, removing it, and supplying heat to the mold when it is removed from said environment to keep the mold heated while the glass is cooling.

References Cited in the file of this patent

UNITED STATES PATENTS

| | | |
|---|---|---|
| 544,248 | Cutler | Aug. 6, 1895 |
| 787,438 | Cutler | Apr. 18, 1905 |
| 2,333,076 | Stewart | Oct. 26, 1943 |
| 2,377,946 | Leary | June 12, 1945 |
| 2,442,338 | Borkland | June 1, 1948 |
| 2,534,523 | McCormick | Dec. 19, 1950 |
| 2,599,554 | Howenstine | June 10, 1952 |
| 2,665,524 | Brown | Jan. 12, 1954 |
| 2,671,987 | Jendrisak | Mar. 16, 1954 |
| 2,682,730 | Rossen | July 6, 1954 |
| 2,702,411 | Winstead | Feb. 22, 1955 |
| 2,817,928 | Lambert et al. | Dec. 31, 1957 |
| 2,871,623 | Marini | Feb. 3, 1959 |